United States Patent [19]

Baxter

[11] Patent Number: 5,441,640
[45] Date of Patent: Aug. 15, 1995

[54] MOBILE WASTE TREATMENT APPARATUS

[76] Inventor: Richard C. Baxter, 4375 Mary St., Moline, Mich. 49335

[21] Appl. No.: 206,325

[22] Filed: Mar. 7, 1994

Related U.S. Application Data

[63] Continuation-in-part of Ser. No. 918,589, Jul. 22, 1992, abandoned.

[51] Int. Cl.⁶ .............................................. C02F 3/12
[52] U.S. Cl. .................................. 210/607; 210/624; 210/625; 210/195.3; 210/202
[58] Field of Search ............... 210/607, 614, 620, 622, 210/623, 624, 625, 626, 628, 195.1, 195.3, 202, 222.1, 222.2, 258, 259, 241, 242.1, 242.2, 610, 611

[56] References Cited

U.S. PATENT DOCUMENTS

| | | | |
|---|---|---|---|
| 2,457,057 | 12/1948 | Mallory | 210/624 |
| 2,893,957 | 7/1959 | Genter et al. | 210/612 |
| 3,386,911 | 6/1968 | Albertson | 210/966 |
| 3,409,545 | 11/1968 | Albertson | 210/906 |
| 3,730,881 | 5/1973 | Armstrong | 210/622 |
| 3,847,803 | 11/1974 | Fisk | 210/605 |
| 3,981,800 | 9/1976 | Ort | 210/605 |
| 4,057,401 | 11/1977 | Boblitz | 210/180 |
| 4,246,101 | 1/1981 | Selby, III | 210/615 |
| 4,488,968 | 12/1984 | Hong et al. | 210/605 |
| 4,511,370 | 4/1985 | Hunziker et al. | 210/630 |
| 4,655,925 | 4/1987 | Tabata et al. | 210/605 |
| 4,663,044 | 5/1987 | Goronszy | 210/610 |
| 4,695,376 | 9/1987 | Astrom et al. | 210/122 |
| 4,710,292 | 12/1987 | DeVos | 210/218 |
| 4,915,840 | 4/1990 | Rozich | 210/605 |
| 4,997,557 | 3/1991 | Andersen | 210/242.2 |
| 4,999,103 | 3/1991 | Bogart | 210/151 |
| 5,102,548 | 4/1992 | Baxter | 210/621 |
| 5,110,459 | 5/1992 | Baxter | 210/605 |
| 5,227,067 | 7/1993 | Runyon | 210/610 |
| 5,227,068 | 7/1993 | Runyon | 210/610 |

*Primary Examiner*—Christopher Upton
*Attorney, Agent, or Firm*—Price, Heneveld, Cooper, DeWitt & Litton

[57] ABSTRACT

A sequencing batch waste treatment facility with pretreatment mixing and equalization by mixing with selectively bred bacteria to achieve a selected waste to bacteria ratio, wherein waste is treated and reduced to acceptable biological oxygen demand levels for municipal-type waste treatment or general discharge per regulatory permit. A treatment colony of mature bacteria is cultivated and maintained in a treatment tank while a colony of young bacteria, separate from the treatment colony, is selectively bred in a bacteria tank to be particularly adapted to digest the waste being treated. Newly received waste is mixed to break macroscopic solid waste apart, into microscopic solid waste and to blend solid waste and liquid waste components into a waste slurry. Some of the selectively bred bacteria are portioned and mixed into the waste slurry up to an equalization point. The equalized batch of waste slurry is subsequently transferred to treatment.

24 Claims, 3 Drawing Sheets

MOBILE WASTE TREATMENT APPARATUS

CROSS-REFERENCES TO RELATED APPLICATION

This is a continuation-in-part of copending U.S. patent application Ser. No. 07/918,589, entitled MOBILE WASTE TREATMENT APPARATUS and filed on Jul. 22, 1992, now abandoned, by Richard C. Baxter, the disclosure of which is incorporated here by reference.

BACKGROUND OF THE INVENTION

The present invention generally relates to sewage treatment and specifically to high concentration waste which cannot be accommodated by common municipal-type waste treatment facilitates and to situations which require waste treatment immediately and until municipal-type waste treatment can be provided.

Discharge standards for waste treatment facilities are closely regulated by various governmental agencies. A standard unit of measure is the biological oxygen demand (BOD) loading concentration, commonly given in units of parts per million (ppm). in the inventor's home state of Michigan, for example, the BOD for secondary municipal-type waste treatment facility discharge is limited to 20–30 ppm. This typically mandates a BOD less than 250 ppm in the sanitary sewer which supplies the municipal-type waste treatment facility, in order to avoid overloading and shocking the treatment facility system.

Waste treatment facilities are typically designed to accommodate specified volumes of waste at a specific BOD. The mandated maximum BOD limit typically accommodates residential sanitary sewer systems at volumes which do not exceed design capacities of the specific municipal-type waste treatment facility used. However, the capacity of a municipal-type waste treatment facility is commonly met and exceeded by growing surrounding communities. Thus, the situation of a municipal waste treatment facility only marginally accommodating the treatment requirements of the community or actually operating outside of specification is a common occurrence. Further, with such high community demand, the municipal facility cannot further accommodate sources of high concentration waste, including, but not limited to, landfill leachate, septage, and holding tank waste, for example.

Leachate typically has a BOD of about 5,000 ppm with septage typically having about a 3,500 ppm BOD. Clearly, these are far beyond and cannot be accommodated by the typical municipal-type waste treatment maximum BOD limit of about 250 ppm. Further, holding tank waste presents a different problem, namely excessive amounts of macroscopic solid waste which may typically account for up to 40 percent of a holding tank's contents.

Another waste treatment problem occurs when municipal waste treatment connection is simply not available and the alternative use of a holding tank and drainage field is inappropriate. One solution to the unavailability of municipal treatment is to truck the waste from the sight of origin to a treatment facility. However, this is often a costly proposition.

A common method of disposal for each of the above identified sources of waste, including high concentration waste, is to simply spread the waste over an open field, such as a farm field. This presents further problems. First, nitrates, commonly found in high concentrations in this waste, quickly filter through the ground and settle into ground water tables, potentially and likely polluting the ground water. Second, even if buried or cultivated into the soil, solid wastes have a tendency to "float" up through and surface above the ground. Finally, monitoring and regulating the disposal of heavy metal and toxic waste is particularly difficult in surface dispersion programs with significant ground and water pollution problems resulting.

SUMMARY OF THE INVENTION

The aforementioned problems and concerns are addressed and effectively resolved by the present invention which presents a modular approach to process high BOD waste and waste containing macroscopic waste solids. Rather than merely discarding high BOD waste and waste solids across fields or burying it, a waste treatment apparatus of the present invention processes and treats high BOD waste and macroscopic waste solids for acceptance by typical municipal-type waste treatment facilities or for general discharge after complete treatment. The present apparatus may also be portable and even mobile for rapid deployment and operation to accommodate circumstances wherein proper permanent waste treatment is not available. Further, this invention includes a breeding bacteria colony, separate from the waste treatment bacteria colony, providing selective bacteria breeding to shorten start-up procedures and to enhance treatment with bacteria which are specifically bred to decompose the particular waste being treated.

The waste treatment apparatus of the present invention includes a tank for receiving a batch of waste and a mixer in the receiving tank for mixing liquid, solid, and macroscopic components of the waste together. A batch of mixed waste is transferred from the receiving tank to a treatment tank for bacterial decomposition of the batch of waste with a colony of waste treatment bacteria. A bacteria tank with a breeding colony of bacteria for selectively breeding bacteria to decompose the waste is also included. A portion of bacteria are transferred from the bacteria tank to the receiving tank. A controller is also provided to operate the waste treatment apparatus according to a predetermined schedule of treatment for each batch of waste received by the receiving tank.

These and other objects, advantages and features of the present invention will become apparent upon review of the following specification in conjunction with the drawings.

DESCRIPTION OF THE PREFERRED EMBODIMENT

Figure 1:
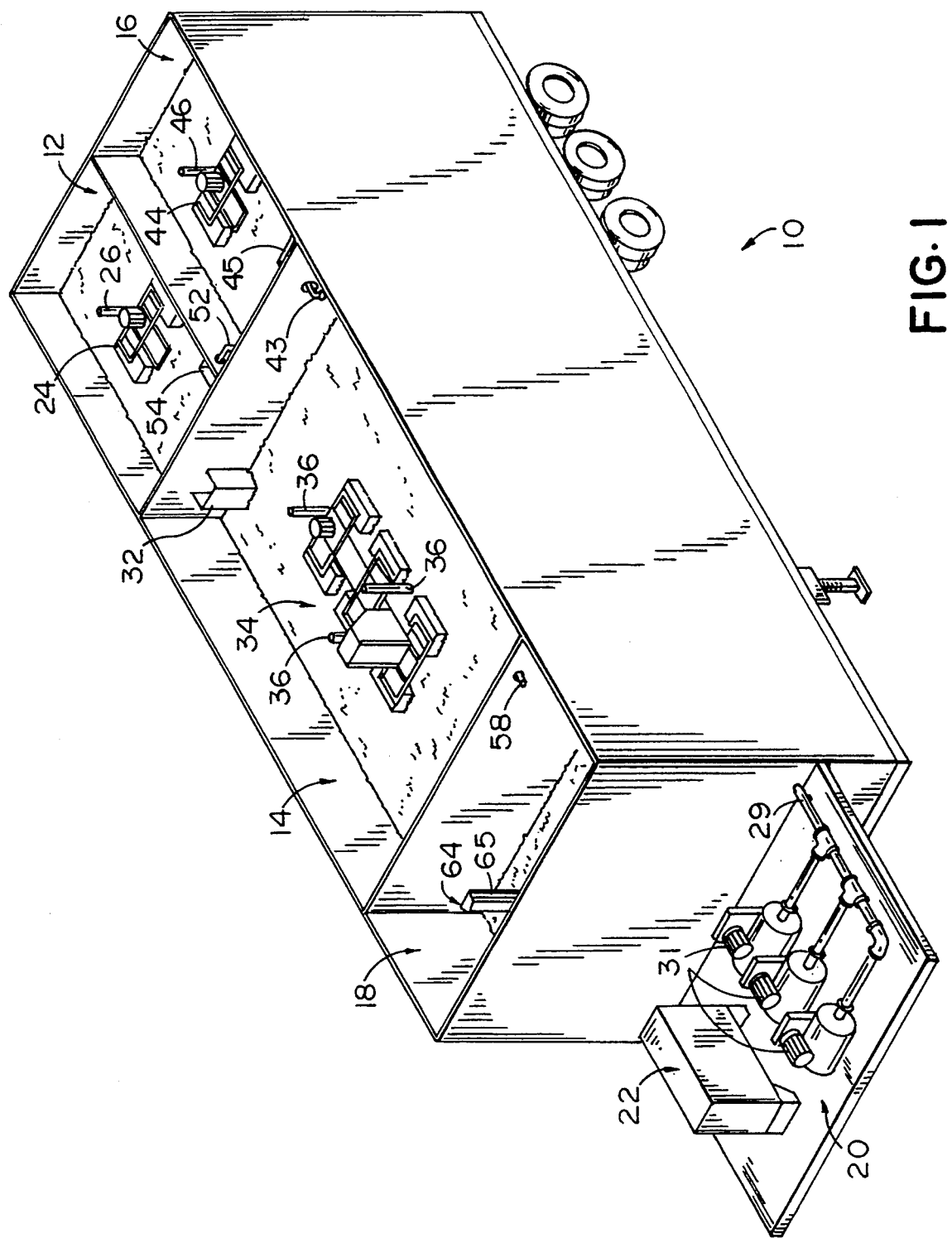
FIG. 1 is a schematic drawing in perspective view of a waste treatment apparatus according to the present invention.

Referring to the figures in greater detail, a preferred embodiment of a waste treatment apparatus 10 according to the present invention includes a receiving or equalization tank 12, a reactor or treatment tank 14, a bacteria tank 16, a digester or sludge tank 18, an oxygen injection system 20, and a treatment controller 22 (FIG. 1). Preferably, apparatus 10 is a single, integrated unit which is transportable having the general form of a semitrailer type shipping container, or is mobile having the general form of a semitrailer as shown in FIG. 1.

Figure 2:
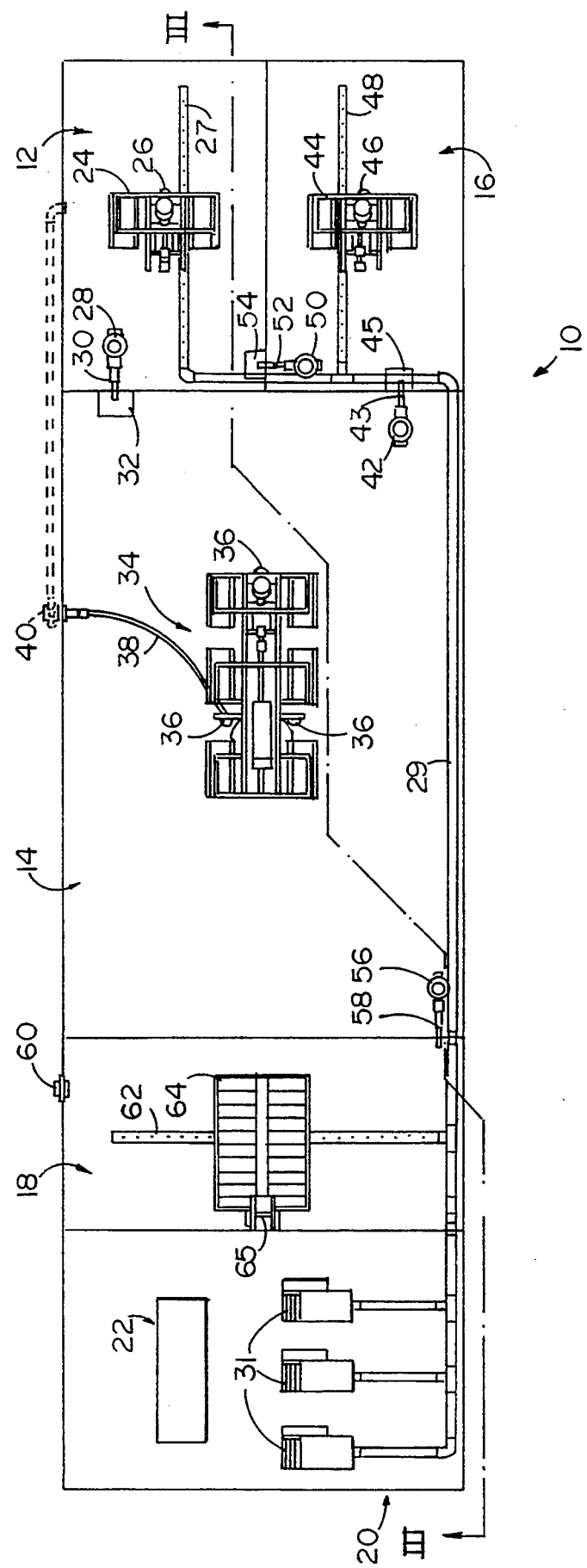
FIG. 2 is a top plan view thereof.

Waste to be treated is preferably received by apparatus 10 in receiving tank 12 as a batch of waste which will then be transferred and treated as a batch in treatment tank 14 (FIGS. 1 and 2). A floating mixer 24 is provided in receiving tank 12 to break macroscopic solid waste into microscopic solid waste and to mix liquid and solid components of the waste to form a generally homogenized waste slurry. Mixer 24 is a standard component and commonly available in the waste treatment field from Aqua-Aerobic Systems, Inc. of Rockford, Ill., for example. Most preferably, mixer 24 is moored in a generally centered position in receiving tank 12 by a pole or stanchion 26. Mixer 24 is coupled with stanchion 26 in sliding engagement so the mixer is free to float upon the surface of waste received in receiving tank 12. A course air bubbler or aerator 27 is also provided in receiving tank 12 for oxygen injection or aeration. Bubbler 27 is also a standard waste treatment industry component and is connected with air supply blowers 31 through a header system 29.

Figure 3:
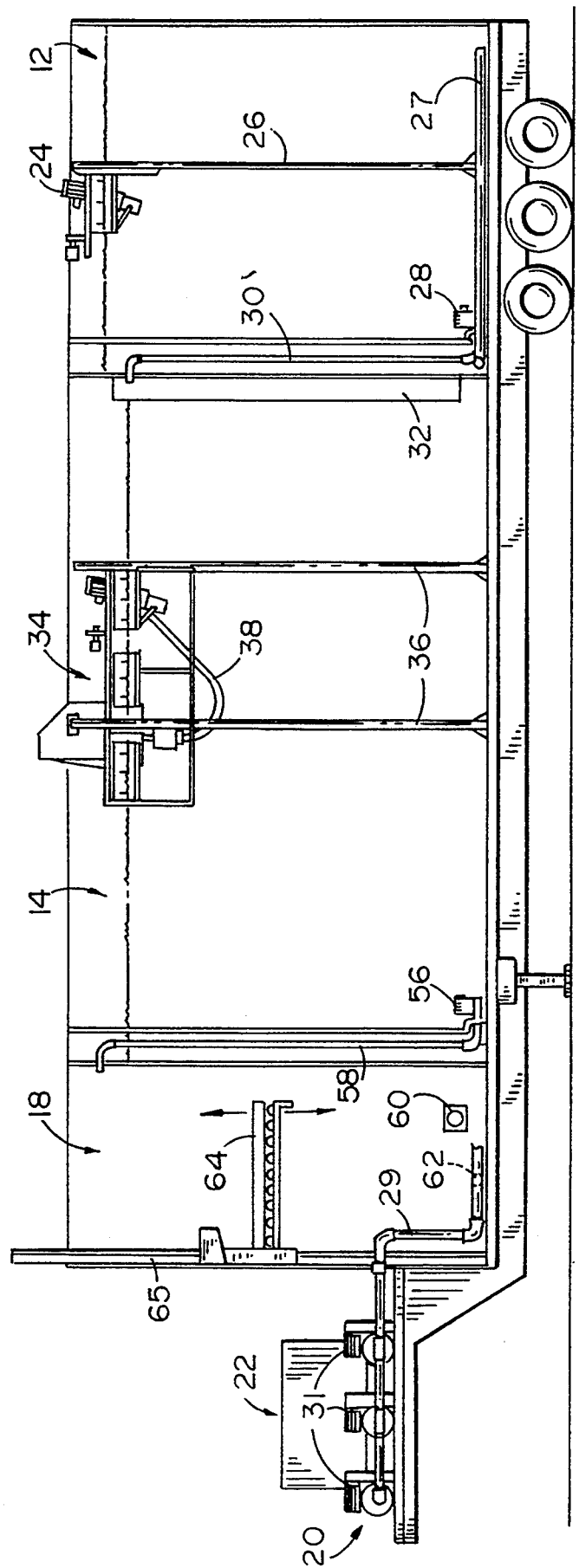
FIG. 3 is a partial side elevational and longitudinal sectional view taken along section line III—III of FIG. 2.

A standard submersible pump 28, commonly known in waste treatment, is also located in receiving tank 12 for transferring a batch of mixed waste from receiving tank 12 to treatment tank 14. The mixed waste is pumped through a line or piping 30 and discharged from receiving tank 12 into treatment tank 14 near the top of the treatment tank 14 (FIG. 3). The mixed waste is received in treatment tank 14 through a baffle 32 which extends above transfer line 30 and extends downward to, but spaced from, the bottom of treatment tank 14.

A floating combination aeration, mixer, and decanter unit 34 is located in treatment tank 14 and slidingly engages three mooring posts 36 which anchor the position of unit 34 while allowing unit 34 to float upon the surface of a batch of waste transferred into treatment tank 14 (FIGS. 1-3). Combination unit 34 is also a standard component readily available in the waste treatment field from Aqua-Aerobic Systems, Inc. for example. Combination unit 34 provides mixing and oxygenation through air injection in treatment tank 14. Unit 34 also decants liquid effluent from treatment tank 14 for discharge from apparatus 10, through a hose 38. The liquid effluent discharged from treatment tank 14 may optionally be diverted by a valve 40 and recirculated to the receiving tank 12 to dilute a subsequent batch of waste. A submersible pump 42 is provided in treatment tank 14 for transferring sludge from the treatment tank to bacteria tank 16 through piping 43 and a baffle 45 which extends downward from piping 43 to, but spaced from, the bottom of bacteria tank 16 (FIG. 2).

Bacteria tank 16 is preferably a twin to receiving tank 12, including a similar floating mixer 44 slidably engaging a mooring post or stanchion 46 and including oxygenation through course air bubbler or aerator 48 which is connected with blowers 31 through header 29 (FIG. 2). Use of aerator 48 in bacteria tank 16 provides a supply of oxygen to the breeding bacteria colony in bacteria tank 16 to stimulate the growth and breeding of bacteria. Bacteria tank 16 further includes a submersible pump 50 for transferring bacteria from bacteria tank 16 to receiving tank 12 through piping 52 which discharges into receiving tank 12 through a baffle 34 which extends downward toward, but spaced from, the bottom of receiving tank 12, from piping 52.

Treatment tank 14 further includes a second submersible pump 56 for transferring sludge from the treatment tank through piping 58 to sludge tank 18. Sludge tank 18 receives sludge from treatment tank 14 for digesting and further reducing the sludge prior to ultimately discharging the sludge through a suction port 60 for appropriate disposal (FIGS. 2 and 3). As with receiving tank 12 and bacteria tank 16, sludge tank 18 also includes oxygenation through course air bubbler or aerator 62 connected with blowers 31 through header 29. Further, a fine bubble diffuser or aerator 64, which is commonly known and available in the field, may also be located in sludge tank 18 and connected with blowers 31 through header 29. Diffuser 64 is most preferably a "retrievable" unit which may be elevated along stanchion 65 for maintenance.

Apparatus 10 is provided with controller 22 for automatic operation of the apparatus (FIGS. 1-3). Controller 22 is preferably a microprocessor device operatively connected with each mixer 24, 44, and 34; each transfer pump 28, 42, 50, and 66; each aerator 27, 34, 46, 62, and 64; and decanter 34 for activating and deactivating each of these devices in an appropriate sequence of events according to a regime of treatment for each batch of waste received by treatment apparatus 10. Controller 22 may also be operatively connected with each tank 12, 14, 16, and 18 and adapted for monitoring the status of each stage of treatment in each tank so that controller 22 automatically activates and deactivates each device according to a preselected algorithm and set of boundary conditions in response to the status of each stage of treatment in each of the tanks, rather than according to a predetermined time schedule of treatment events for example. Conversely, a simplified controller may also comprise a series of cascading timers to perform a series of specific tasks for specific durations of time.

While sludge tank or digester 18 may be operated with course air bubbler 62 and fine bubble diffuser 64 in aerobic bacterial decomposition and reduction of sludge, digester 18 may also be operated in an anaerobic process with fine bubble diffuser 64 and course air bubbler 62 deactivated. In an anaerobic process, digester 18 is preferably a closed cell so gaseous by-products of the anaerobic process may be collected. The collected gaseous by-products may, for example, be used to operate waste treatment apparatus 10.

in its preferred, portable and mobile embodiments, waste treatment apparatus 10 may be transported by a variety of modes, including air, land, and seat transportation. Apparatus 10 is preferably transported to a selected location in a dry condition wherein each of the tanks is generally dry. Once apparatus 10 is positioned at the selected location, waste treatment may commence virtually immediately.

Waste may be received in receiving tank 12 while seed bacteria or freeze-dried bacteria, water, and air are mixed in bacteria tank 16 to provide an initial colony of bacteria for the waste treatment process. The waste in receiving tank 12 is mixed by mixer 24 to mix solid and liquid components of the waste together, producing a generally homogenous waste slurry. The waste may also be aerated by bubbler 27. Waste in receiving tank 12 is mixed and aerated while some or a portion of the bacteria from bacteria tank 16 is portioned through pump 50, piping 52, and baffle 54 (FIG. 2) into receiving tank 12 until a desired ratio of waste to bacteria is obtained. When the desired ratio is reached, the mixture is said to be "equalized."

As will be better understood from the below discussion of waste treatment in treatment tank 14, the point of equalization in receiving tank 12 is a variable which depends upon the quality of waste received and the condition of treatment tank 14 at the time the batch of waste is transferred from receiving tank 12 to treatment tank 14. If operation of apparatus 10 is just beginning and treatment tank 14 is therefore empty when a batch of waste is transferred from receiving tank 12 into treatment tank 14 for example, then a greater number of bacteria per a quantity of waste will be required to reach the point of equalization of receiving tank 12. However, if a large quantity of activated sludge remains in treatment tank 14 after processing a batch of waste, then a smaller quantity of bacteria will be required per a unit of waste in receiving tank 12 to reach a point of equalization since an established colony of treatment bacteria is already resident in treatment tank 14 and the batch of waste from receiving tank 12 will include the colony of treatment bacteria when the batch is transferred into treatment tank 14.

The equalized waste is transferred through pump 28, piping 30, and baffle 32 to treatment tank 14 (FIGS. 2 and 3) for sequential batch reactor (SBR) treatment, described below. Aeration and mixing may be provided by combination unit 34 to stimulate bacterial decomposition. After the equalized waste is transferred from receiving tank 12 to treatment tank 14, a subsequent batch of waste may be received in receiving tank 12 for equalization, similar to the prior batch.

The SBR process in treatment tank 14 operates on a fill and draw principle. Commonly, the process follows the basic steps or phases of fill, react, settle, and decant. The actual time of each step of the SBR process will vary depending upon the quality of waste received and the final treatment results desired. If only BOD reduction is desired for example, a SBR cycle time as short as three hours may be realized. However, if further treatment to obtain nutrient control is required, then the cycle time can be extended according to the process requirements.

The SBR process is subject to a variety of controls which may be utilized according to particular operating strategies. The earliest mode of control begins with the fill phase of the SBR process and is based on reactor liquid level or volume. Using this mode of control, the fill phase is terminated when a preselected volume or depth in treatment tank 14 is attained. This approach provides cycle times which are inversely related to flow rates.

Further, the fill phase may be composed of static fill, mixed fill, or react fill increments. Under static fill, influent flow of equalized waste from receiving tank 12 is introduced to treatment tank 14 in a non-mixed and non-aerated environment. Unit 34 is inactive in a static fill mode. Static full is particularly appropriate for nutrient control and useful for minimizing energy consumption. Mixed fill may be selected to create either an anoxic or anaerobic environment wherein the mixer portion of combination unit 34 is activated to provide mixing in treatment tank 14 during filling. Finally, react fill adds aeration to mixed fill, thereby stimulating bacterial activity and shortening the subsequent reaction time period.

Under any combination of the fill modes, treatment tank 14 is filled to obtain a desired ratio of waste to bacteria. After filling, reaction or treatment proceeds with mixing and aeration by unit 34 until either a selected time has elapsed or measurement of the quality of the contents of treatment tank 14 indicate that a desired quality characteristic has been obtained.

The settling phase follows the reaction or treatment phase. Settling is the quiescent phase of the SBR process during which no aeration or mixing occurs. Treatment tank 14 basically stagnates, allowing particles to precipitate out as activated sludge in the bottom of treatment tank 14, leaving liquid effluent above. The settling phase is typically time dependent.

Clarified effluent may be decanted from treatment tank 14 by unit 34 during the decant phase, after the settling phase. Decanting time typically depends upon the decanter pumping capacity and the depth levels desired for treatment of the next batch. As a part of decanting, a portion of sludge collected in the bottom of treatment tank 14 may be transferred through pump 42, piping 43, and baffle 45 to bacteria tank 16.

Feeding some or a portion of sludge from treatment tank 14 into bacteria tank 16 provides a waste-specific food to selectively breed waste-specific bacteria which are compatible with the condition of and environment created by the particular waste being treated. Some bacteria will also be transferred with the sludge from treatment tank 14. These bacteria will be particularly efficient at decomposition of the specific waste being treated. These bacteria will also serve to replenish or reseed the breeding stock of the breeding bacteria colony with waste specific breeding bacteria. The makeup and waste treatment characteristics of the breeding bacteria colony may also be controlled by the selective addition of chemicals to suppress undesired bacteria and to enhance breeding of certain bacteria to optimize treatment of incoming waste. Aerator 48 may also be activated or inactive to provide an environment ranging from oxygen enriched to anaerobic to further control the characteristics of the breeding bacteria colony.

Those skilled in the art and those who practice the invention will recognize the distinct characteristics of the two separate colonies of bacteria, namely, the established or mature treatment bacteria colony in treatment tank 14 and the young breeding tank bacteria colony in bacteria tank 16. As is the nature of young organisms, the young bacteria from the breeding colony in bacteria tank 16 will be coarse feeders with voracious appetites and will gorge themselves with large portions of food when they are portioned into a fresh batch of waste for treatment in receiving tank 12. By contrast, the established colony of treatment bacteria in treatment tank 14 comprises mature bacteria which will dine meticulously upon the smaller portions of food provided in the equalized batch of waste transferred from receiving tank 12 into treatment tank 14. The use of two separate colonies of bacteria in the invention, namely, the breeding bacteria colony in bacteria tank 16 and the treatment bacteria colony in treatment tank 14, thereby utilizes the waste reduction characteristics peculiar to each colony to effectively reduce the waste received and treated by the invention and to enhance the performance of a waste treatment apparatus according to the invention. This multiple bacteria colony waste treatment apparatus not only speeds up initial start-up of the treatment operation, but continues to enhance the effectiveness or efficiency of the process as it continues to run and the characteristics of the waste received may fluctuate.

Also as a part of the decant phase, a portion of the sludge from treatment tank 14 may be transferred through pump 66 and piping 68 to sludge tank or digester 18. The amounts of sludge transferred out of treatment tank 14 and the amount of liquid effluent decanted from treatment tank 14 are each dependent upon the amount and characteristics of the equalized waste which will be transferred from receiving tank 12 into treatment tank 14. One consideration is that sufficient activated sludge must remain in treatment tank 14 so the desired ratio of waste to bacteria will be obtained after the transfer of equalized waste from receiving tank 12 into treatment tank 14. Another consideration is that rather than recycle liquid effluent from treatment tank 14 into receiving tank 12 to dilute subsequent batches of waste, the liquid effluent most preferably remains in treatment tank 14 for any required diluting of the subsequent batch of waste in treatment tank 14 upon transfer from receiving tank 12.

The above description is considered that of the preferred embodiments only. Modifications of the invention, including, but not limited to adapting the invention for non-transportable use for example, will occur to those skilled in the art and to those who make-or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A SBR waste treatment apparatus comprising:
    a receiving tank to receive a batch of waste;
    a treatment tank operatively connected with said receiving tank in selective fluid communication to selectively transfer the batch of waste from said receiving tank into said treatment tank and to isolate the batch of waste during treatment;
    means in said treatment tank for bacterial decomposition of the batch of waste, said means including a first colony of bacteria comprising established, mature bacteria;
    a bacteria tank operatively connected with said receiving tank in selective fluid communication to selectively portion the contents of said bacteria tank into said receiving tank;
    breeding means in said bacteria tank for selectively breeding bacteria to decompose the waste, said breeding means including a second colony of bacteria, distinct from said first colony of bacteria, wherein said second colony of bacteria is defined young bacteria relative to said first colony of bacteria; and
    a controller operatively connected with each said tank to selectively transfer the batch of waste from said receiving tank into said treatment tank, to isolate and treat waste in said treatment tank, and to selectively portion bacteria from said bacteria tank into said receiving tank, all according to a regime of treatment for each batch of waste received.

2. The apparatus of claim 1 further including a mixer located in said receiving tank to mix liquid waste and solid waste components of the batch of waste together, into a waste slurry, wherein said solid waste includes macroscopic solid waste and wherein said mixer breaks said macroscopic solid waste apart into microscopic solid waste and blends said microscopic solid waste with said liquid waste to form said waste slurry.

3. The apparatus of claim 2 further including a discharge operatively connected in fluid communication with said treatment tank to decant liquid effluent from said treatment tank.

4. The apparatus of claim 3 wherein said discharge includes a diverter having means for selectively transferring liquid effluent from said treatment tank to said receiving tank.

5. The apparatus of claim 4 wherein each of a second mixer and an aerator are located in said treatment tank.

6. The apparatus of claim 5 wherein said apparatus is an integrated unit adapted for transportation from one location to another location.

7. The apparatus of claim 2 further including a sludge tank operatively connected with said treatment tank in selective fluid communication to selectively portion sludge from said treatment tank into said sludge tank, and including digester means in said sludge tank for bacterial decomposition of sludge, said digester means having a third colony of bacteria, distinct from each of said first colony and said second colony.

8. The apparatus of claim 7 wherein said apparatus is an integrated unit adapted for transportation from one location to another location.

9. The apparatus of claim 1 further including a sludge tank operatively connected with said treatment tank in selective fluid communication to selectively portion sludge from said treatment tank into said sludge tank, and including digester means in said sludge tank for bacterial decomposition of sludge, said digester means having a third colony of bacteria, distinct from each of said first colony and said second colony.

10. The apparatus of claim 1 wherein said apparatus is a single, integrated unit adapted for transportation from one location to another location.

11. A SBR waste treatment apparatus comprising:
    equalization means for receiving a batch of waste, for mixing bacteria with said batch of waste to obtain an equalized batch of waste having a selected ratio of waste to bacteria, and for mixing solid waste and liquid waste components of the waste batch together to form a substantially homogeneous waste slurry;
    treatment means for isolating a batch of said waste slurry during treatment and for treating said waste slurry with bacterial decomposition, said treatment means including a first colony of bacteria and being operatively connected with said equalization means in selective fluid communication to selectively transfer said batch of waste slurry from said equalization means into said treatment means, wherein said first colony of bacteria is defined by established, mature bacteria;
    bacteria means for selectively breeding bacteria which are particularly adapted to digest the waste being treated, said bacteria means including a second colony of bacteria distinct from said first colony of bacteria and being operatively connected with said equalization means in selective fluid communication to selectively portion bacteria from said bacteria means into said equalization means, wherein said second colony of bacteria is defined by young bacteria relative to said first colony of bacteria; and control means for activating and deactivating each of said means according to a regime of treatment for each batch of waste received by said equalization means, said control means being operatively connected with each of said equalization means, said treatment means, and said bacteria means.

12. The apparatus of claim 11 wherein said solid waste includes macroscopic solid waste and wherein said equalization means includes a mixer, said mixer having means for breaking said macroscopic solid waste apart, into microscopic solid waste and further having means for blending said microscopic solid waste with said liquid waste to form said waste slurry.

13. The apparatus defined in claim 11 further including discharge means for discharging at least a portion of the contents of said treatment means from said apparatus.

14. The apparatus defined in claim 13 wherein said discharge means includes diverter means for selectively transferring liquid effluent from said treatment means to said equalization means.

15. The apparatus defined in claim 11 further including a digester operatively connected with said treatment means in selective fluid communication to selectively portion sludge from said treatment means into said digester, said digester including means for bacterial decomposition of the sludge, said means including a third colony of bacteria distinct from each of said first colony and said second colony.

16. A method of batch waste treatment, comprising the steps of:
   (a) receiving a batch of waste in a receiving receptacle;
   (b) mixing solid and liquid components of the batch of waste together in said receiving receptacle to form a batch of generally homogenized waste slurry;
   (c) selectively breeding a first colony of bacteria to be particularly adapted to digest the waste being treated such that said first colony of bacteria is defined by relatively young bacteria;
   (d) mixing a portion of said first colony of bacteria with said batch of waste slurry in said receiving receptacle to form a batch of equalized waste slurry;
   (e) transferring said batch of equalized waste slurry to a treatment receptacle;
   (f) isolating and treating said batch of equalized waste slurry in said treatment receptacle by mixing, oxygenation, and bacterial decomposition;
   (g) discharging liquid effluent from said treatment receptacle;
   (h) discharging a portion of sludge from said treatment receptacle while maintaining a second colony of bacteria, distinct from said first colony, in said treatment receptacle, wherein said second colony of bacteria is defined by established, mature bacteria relative to said first colony of bacteria;
   (i) receiving a subsequent batch of waste in said receiving receptacle; and
   (j) repeating steps (a) through (h) until the desired waste treatment is completed.

17. The method defined in claim 16 further including providing a mechanized means for performing each of said steps and providing a controller operatively connected with each said mechanized means for automatically performing each of said steps according to a regime of treatment for each batch of waste received.

18. The method defined in claim 16 wherein said step of discharging liquid effluent includes selectively transferring liquid effluent from said treatment receptacle to said receiving receptacle.

19. The method defined in claim 16 wherein said step of discharging a portion of sludge includes transferring said portion of sludge from said treatment receptacle to a sludge digester and further decomposing said sludge in said sludge digester by bacterial decomposition, said sludge digester having a third colony of bacteria, distinct from each of said first colony and said second colony.

20. An SBR waste treatment apparatus comprising:
   a vessel for receiving and treating waste;
   a plurality of dividers in said vessel, said dividers defining a receiving tank in said vessel to receive a batch of waste, said dividers defining a treatment tank in said vessel to receive a mixed batch of waste from said receiving tank, and to isolate said mixed batch of waste, and said dividers defining a bacteria tank in said vessel;
   a first colony of established, mature bacteria located in said treatment tank for bacterial decomposition of waste;
   breeding means in said bacteria tank for selectively breeding bacteria to decompose the waste, said breeding means including a second colony of bacteria, distinct from said first colony of bacteria, wherein said second colony of bacteria is defined by young bacteria relative to said first colony of bacteria;
   a mixer located in said receiving tank, said waste including liquid waste and macroscopic solid waste components, said mixer breaking said macroscopic solid waste apart, into microscopic solid waste, said mixer mixing said microscopic solid waste and said liquid waste components together, into a waste slurry;
   a first pump operatively connected between said receiving tank and said treatment tank to transfer a batch of waste slurry from said receiving tank to said treatment tank;
   a bacteria pump operatively connected between said bacteria tank and said receiving tank to portion bacteria from said second colony in said bacteria tank to said receiving tank; and
   a controller operatively connected with said mixer and each of said pumps, said controller activating and deactivating said mixer and each of said pumps according to a regime of treatment for each batch of waste received by said receiving tank.

21. The apparatus of claim 20 wherein said dividers further define a sludge tank in said vessel, wherein said apparatus further includes a third colony of bacteria in said sludge tank distinct from each of said first colony and said second colony, and wherein said apparatus includes a sludge pump operatively connected between said treatment tank and said sludge tank to portion sludge from said treatment tank to said sludge tank.

22. The apparatus of claim 21 wherein said apparatus is a single, integrated unit adapted for transportation from one location to another location.

23. The apparatus of claim 22 wherein said apparatus includes wheels and a frame adapted for trailering said apparatus.

24. The apparatus of claim 20 wherein said apparatus is a single, integrated unit adapted for transportation from one location to another location.

* * * * *

UNITED STATES PATENT AND TRADEMARK OFFICE
CERTIFICATE OF CORRECTION

PATENT NO. : 5,441,640
DATED : August 15, 1995
INVENTOR(S) : Richard C. Baxter

It is certified that error appears in the above-indentified patent and that said Letters Patent is hereby corrected as shown below:

Column 1, line 23;
   "in the" should be --In the--.

Column 1, line 51;
   Before "municipal" delete --.--.

Column 1, line 62;
   "sight" should be --site--.

Column 3, line 57;
   Before "preferably" delete --.--.

Column 4, line 49;
   "in its" should be --In its--.

Column 4, line 51;
   "seat" should be --sea--.

*Column 5, line 58;
   "full" should be --fill--.

Signed and Sealed this

Seventh Day of May, 1996

Attest:

BRUCE LEHMAN

*Attesting Officer*   Commissioner of Patents and Trademarks